(12) United States Patent
Ochiai

(10) Patent No.: US 12,386,511 B2
(45) Date of Patent: Aug. 12, 2025

(54) MEMORY CONTROLLER, CONTROL METHOD OF MEMORY CONTROLLER, AND STORAGE MEDIUM

(71) Applicant: CANON KABUSHIKI KAISHA, Tokyo (JP)

(72) Inventor: Wataru Ochiai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/638,814

(22) Filed: Apr. 18, 2024

(65) Prior Publication Data

US 2024/0370167 A1    Nov. 7, 2024

(30) Foreign Application Priority Data

May 2, 2023   (JP) ................................ 2023-076316

(51) Int. Cl.
  *G06F 3/06* (2006.01)
(52) U.S. Cl.
  CPC ............ *G06F 3/061* (2013.01); *G06F 3/0659* (2013.01); *G06F 3/0673* (2013.01)
(58) Field of Classification Search
  None
  See application file for complete search history.

(56) References Cited

U.S. PATENT DOCUMENTS

| | | | |
|---|---|---|---|
| 11,169,937 B2 | 11/2021 | Kanoh | |
| 2003/0188107 A1* | 10/2003 | Hill | G06F 12/0862 |
| | | | 712/E9.047 |
| 2022/0350735 A1 | 11/2022 | Ito et al. | |

FOREIGN PATENT DOCUMENTS

| | | |
|---|---|---|
| JP | 6237945 B1 | 11/2017 |
| JP | 2022168545 A | 11/2022 |

* cited by examiner

*Primary Examiner* — Brian R Peugh
(74) *Attorney, Agent, or Firm* — Venable LLP

(57) ABSTRACT

A memory controller for controlling DRAM, comprising: a first storage unit configured to store requests that each comprise information about a priority and an access type received by the memory controller; a first control unit configured to select requests from the requests; a second storage unit configured to store the selected requests; and a second control unit configured to rearrange the requests stored in the second storage unit to generate a DRAM command and to issue the DRAM command to the DRAM, wherein the second control unit generates a priority access type indicating which access type request to preferentially issue to the DRAM, and the first control unit selects the requests, based on the information about the priority and the access type of each of the requests stored in the first storage unit, and the priority access type.

13 Claims, 7 Drawing Sheets

MEMORY CONTROLLER, CONTROL METHOD OF MEMORY CONTROLLER, AND STORAGE MEDIUM

BACKGROUND OF THE INVENTION

Field of the Invention

The present disclosure relates to a memory controller, a control method of a memory controller, and a storage medium.

Description of the Related Art

At present, dynamic random access memory (hereinafter, DRAM) is widely used. However, demand for higher performance of DRAM is increasing along with enhancement of functionality and performance of computer systems. A memory controller that controls DRAM is required to maximize access performance of the DRAM.

Factors that reduce the access performance of the DRAM include a page miss in which a closed page is accessed, and switching between reading and writing. In a case where a page miss has occurred, if an open page is present, it is necessary to perform a precharge to close the open page, and to then perform activation to open a necessary page, which affects access performance. In order to suppress a reduction in performance, many methods have been proposed for a memory controller that controls DRAM.

Among the proposed methods, a reordering method rearranges requests for DRAM access (hereinafter, referred to as requests) so that a penalty (hereinafter, referred to as a DRAM access penalty) generated at the time of DRAM access becomes the smallest. Through this rearrangement, the DRAM access penalties are reduced and the reduction in access performance is suppressed.

Japanese Patent No. 6237945 discloses a technology in which a request buffer for storing requests is provided, a bank group to which a memory request is to be issued is determined based on the number of banks that are not busy among banks belonging to a memory bank group, and the memory request is issued.

However, in the reordering method, a DRAM command such as active, precharge, read, or write is generated in parallel from a request group in the request buffer in order to determine the DRAM access penalty and to rearrange the requests. Thus, a reordering logic circuit that implements the reordering method becomes complex. Therefore, in the technology disclosed in Japanese Patent No. 6237945, there is a problem that an area of a DRAM command generation logic circuit exponentially increases as the number of request buffer stages increases.

On the other hand, Japanese Patent Laid-Open No. 2022-168545 provides a technology that can reduce an area of a reordering logic circuit for rearranging requests. However, in Japanese Patent Laid-Open No. 2022-168545, since only a page miss is taken into consideration, switching between reading and writing frequently occurs, and access efficiency to the memory decreases.

SUMMARY OF THE INVENTION

The present invention has been made in view of the above problems and provides a technology for improving access efficiency to a memory.

According to one aspect of the present invention, there is provided a memory controller for controlling dynamic random access memory (DRAM), comprising: a first storage unit configured to store requests each comprising information about a priority and an access type received by the memory controller; a first control unit configured to select requests from the requests stored in the first storage unit; a second storage unit configured to store the requests selected by the first control unit; and a second control unit configured to rearrange the requests stored in the second storage unit to generate a DRAM command and to issue the DRAM command to the DRAM, wherein the second control unit is configured to generate a priority access type indicating which access type request to preferentially issue to the DRAM, and the first control unit is configured to select the requests, based on the information about the priority and the access type of each of the requests stored in the first storage unit, and the priority access type.

Further features of the present invention will become apparent from the following description of exemplary embodiments (with reference to the attached drawings).

DESCRIPTION OF THE EMBODIMENTS

Figure 1:
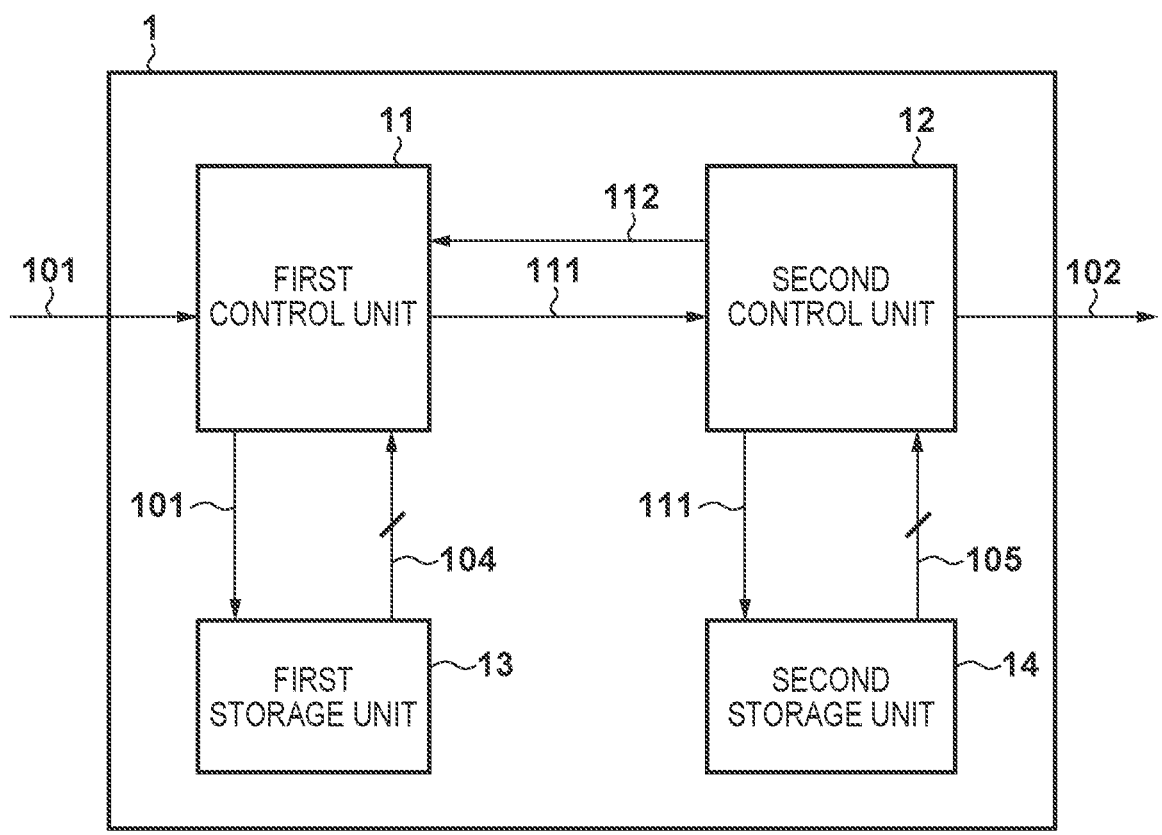
FIG. 1 illustrates a configuration diagram of a memory controller according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A main storage apparatus of a computer system typically uses DRAM as a memory device thereof. DRAM has a larger storage capacity per chip than other memory devices and is less expensive than other memory devices when compared at the same capacity. Therefore, DRAM enables a large-capacity memory system to be constructed at low cost.

The DRAM has a structure in which memory cells are two-dimensionally arranged. Each row of memory cells arranged in two dimensions is called a page. In order to access a certain memory cell, a page is first designated and information about all memory cells constituting one page is internally read out. Next, a memory cell to be accessed is specified by designating a column. An access is then made to the specified memory cell. Further, the inside of the DRAM has a plurality of memory cells arranged in two dimensions, and each memory cell arranged in two dimensions is called a bank. The bank is designated by a bank address.

A page that has been internally read is called open, and a page that has not been internally read is called closed. In order to open a closed page, a page address is designated to execute activation. On the other hand, in order to close an open page, a precharge is executed. In a case where an open page is already present and a page different from this page is to be opened, a precharge is executed for closing the open page and then activation is executed for opening the target page.

Configuration of Memory Controller

FIG. 1 is a diagram illustrating a configuration example of a memory controller 1 according to a first embodiment. The memory controller 1 controls dynamic random access memory (DRAM). The memory controller 1 includes a first control unit 11, a second control unit 12, a first storage unit 13, and a second storage unit 14. The main functions and features of each functional unit constituting the memory controller 1 will be described below.

The first control unit 11 stores a received request 101 in the first storage unit 13. In addition, the first control unit 11 selects a request that satisfies a condition from all intra-first storage unit requests 104 stored in the first storage unit 13 and transmits the selected request 111 to the second control unit 12.

The second control unit 12 stores the received request 111 in the second storage unit 14. In addition, the second control unit 12 performs reordering on intra-second storage unit requests 105 stored in the second storage unit 14 so that a penalty of the DRAM access becomes smaller, and it generates a DRAM command 102. In addition, in a case where the DRAM command 102 is an RD command or a WR command, the second control unit 12 generates a priority access type 112 and transmits the priority access type 112 to the first control unit 11.

The first storage unit 13 stores the request 101 received by the first control unit 11. All entries in the first storage unit 13 can be read in parallel by the first control unit 11.

The second storage unit 14 stores the request 111 received by the second control unit 12. A magnitude of entry numbers of the requests 111 stored in the second storage unit 14 indicates the order in which the requests 111 are stored. That is, the request 111 stored more recently is stored in an entry having a relatively large entry number. All entries in the second storage unit 14 can be read in parallel by the second control unit 12.

Next, an operation of the first control unit 11 will be described. Upon receiving the request 101, the first control unit 11 stores the request 101 in the first storage unit 13. Here, in the first embodiment, the request 101 includes information about an access type and a priority.

The above-described access type indicates a type of request. In the first embodiment, there are two access types, RD and WR. The RD request performs an operation of reading data from the DRAM. The WR request performs an operation of writing data to the DRAM. The access type is not limited to the two types described above, and it may be desirably set.

In addition, the priority indicates a priority of the request. If it is possible to indicate the priority, a format of the priority may be desirably selected.

Operation of First Control Unit

Subsequently, a procedure will be described in detail in which the first control unit 11 according to the first embodiment selects a request that satisfies a condition from the intra-first storage unit requests 104 stored in the first storage unit 13. Hereinafter, conditions (1) and (2) under which the first control unit 11 selects a request from the intra-first storage unit requests 104 will be described.

(1) A request that is an intra-first storage unit request 104 stored in the first storage unit 13 and in which a priority of the intra-first storage unit request 104 is equal to or higher than a threshold.

(2) A request that is an intra-first storage unit request 104 stored in the first storage unit 13 and in which an access type of the intra-first storage unit request 104 matches the priority access type 112.

Figure 2:
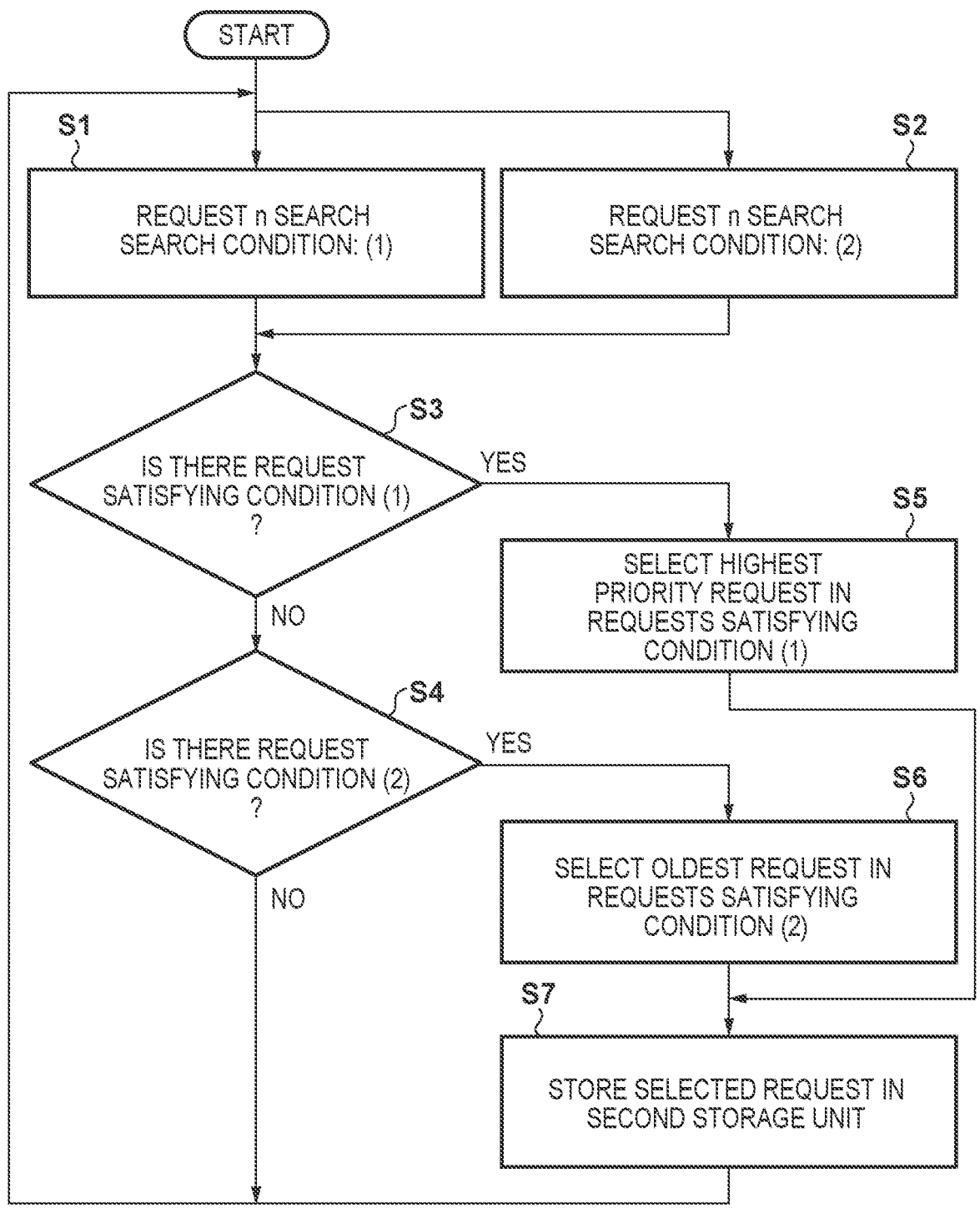
FIG. 2 is a flowchart illustrating a procedure for selecting a request from a first storage unit according to the first embodiment.

Subsequently, an operation in which the first control unit 11 selects a request from the intra-first storage unit requests 104 will be described in more detail with reference to the flowchart of FIG. 2. FIG. 2 is a flowchart illustrating an example of a control method of the memory controller 1. In FIG. 2, steps S1 to S7 indicate processes that are executed at the time of selecting a request.

In FIG. 2, the respective processes of steps S1 and S2 are processes of searching the first storage unit 13 for a request that satisfies the above-described conditions (1) and (2). As shown in FIG. 2, in the first embodiment, the first control unit 11 searches the first storage unit 13 for a request that satisfies the condition (1) or (2) in parallel by executing the processes of steps S1 and S2 in parallel.

First, the process of step S1 will be described. In step S1, the first control unit 11 selects and extracts a request satisfying the condition (1) from the intra-first storage unit requests 104 stored in the first storage unit 13. Depending on the definition of the condition (1) described above, a request that satisfies the condition (1) is a request having a priority equal to or higher than a preset threshold. Here, the first control unit 11 may extract a plurality of requests satisfying the condition (1).

Subsequently, the process of step S2 will be described. In step S2, the first control unit 11 selects and extracts a request satisfying the condition (2) from the intra-first storage unit requests 104 stored in the first storage unit 13. Depending on the definition of the condition (2) described above, a request that satisfies the condition (2) is a request of which the access type matches the priority access type 112 generated by the second control unit 12. Here, the first control unit 11 may extract a plurality of requests satisfying the condition (2).

In step S3, the first control unit 11 determines whether a request is present satisfying the condition (1) in the first storage unit 13. In a case where a request is present satisfying the condition (1) in the first storage unit 13, the process proceeds to step S5. On the other hand, in a case where no request is present satisfying the condition (1) in the first storage unit 13, the process proceeds to step S4.

In step S4, the first control unit 11 determines whether a request is present satisfying the condition (2) in the first storage unit 13. In a case where a request is present satisfying the condition (2) in the first storage unit 13, the process proceeds to step S6. On the other hand, in a case where no request is present satisfying the condition (2) in the first storage unit 13, the process returns to the execution of the processes of steps S1 and S2.

In step S5, the first control unit 11 selects a request with the highest priority among requests satisfying the condition (1) in the first storage unit 13, as the request 111. In a case where a plurality of requests are present with the highest priority among the requests satisfying the condition (1) in the first storage unit 13, the oldest request is selected as the request 111. Thereafter, the process proceeds to step S7.

In step S6, the first control unit 11 selects the oldest request among the requests satisfying the condition (2) in the first storage unit 13, as the request 111. Thereafter, the process proceeds to step S7.

In step S7, in a case where the request 111 selected in step S5 or S6 is present and an empty entry is present in the second storage unit 14, the first control unit 11 transmits the selected request 111 to the second control unit 12 and returns to the processes of steps S1 and S2. The second control unit 12 stores the request 111 in the empty entry of the second storage unit 14. In addition, in a case where no empty entry is present in the second storage unit 14, the first control unit 11 returns to the processes of steps S1 and S2 without transmitting the request 111.

Operation of Second Control Unit

Subsequently, an operation of the second control unit 12 will be described. When the second control unit 12 receives the selected request 111 transmitted by the first control unit 11, the second control unit stores the request 111 in the second storage unit 14.

Further, the second control unit 12 performs reordering on the intra-second storage unit requests 105 stored in the second storage unit 14 so that a penalty of the DRAM access becomes smaller, and it generates a DRAM command 102. Then, the second control unit 12 issues the DRAM command 102 to the DRAM. The reordering rearranges requests so that the DRAM access penalty becomes the smallest. By this rearrangement, the DRAM access penalty can be reduced and the degradation in access performance can be suppressed.

Operation of First Storage Unit

Subsequently, the first storage unit 13 will be described. The first storage unit 13 stores the request 101 received by the first control unit 11. The first storage unit 13 may have a queue structure or a buffer structure as long as the information about the request can be read from any entry.

In addition, elements constituting the first storage unit 13 may be any element as long as the element satisfies the required specifications for the memory controller 1, such as speed and power consumption. That is, the element constituting the first storage unit 13 may be constituted by applying any one of an SRAM and a flip-flop (F/F).

Operation of Second Storage Unit

Subsequently, the second storage unit 14 will be described. The second storage unit 14 stores the request 111 received by the second control unit 12. The second storage unit 14 may have a queue structure or a buffer structure as long as the information about the request can be read from any entry.

In addition, elements constituting the second storage unit 14 may be any element as long as the element satisfies the required specifications for the memory controller 1, such as speed and power consumption. That is, the element constituting the second storage unit 14 may be constituted by applying any one of an SRAM and a flip-flop (F/F).

Processing

Subsequently, operations according to the first embodiment will be described with reference to FIGS. 3 and 4, focusing on operations of the first control unit 12, the first storage unit 13, and the second storage unit 14. In the description, it is assumed that the number of entries of the first storage unit 13 is four and the number of entries of the second storage unit 14 is six.

Subsequently, an operation from selection of a request satisfying the condition (1) by the first control unit 11 to storage of the selected request 111 in the second storage unit 14 by the second control unit 12 will be described with reference to FIG. 3. The threshold of the priority in the condition (1) will be described as being 2.

Figure 3:
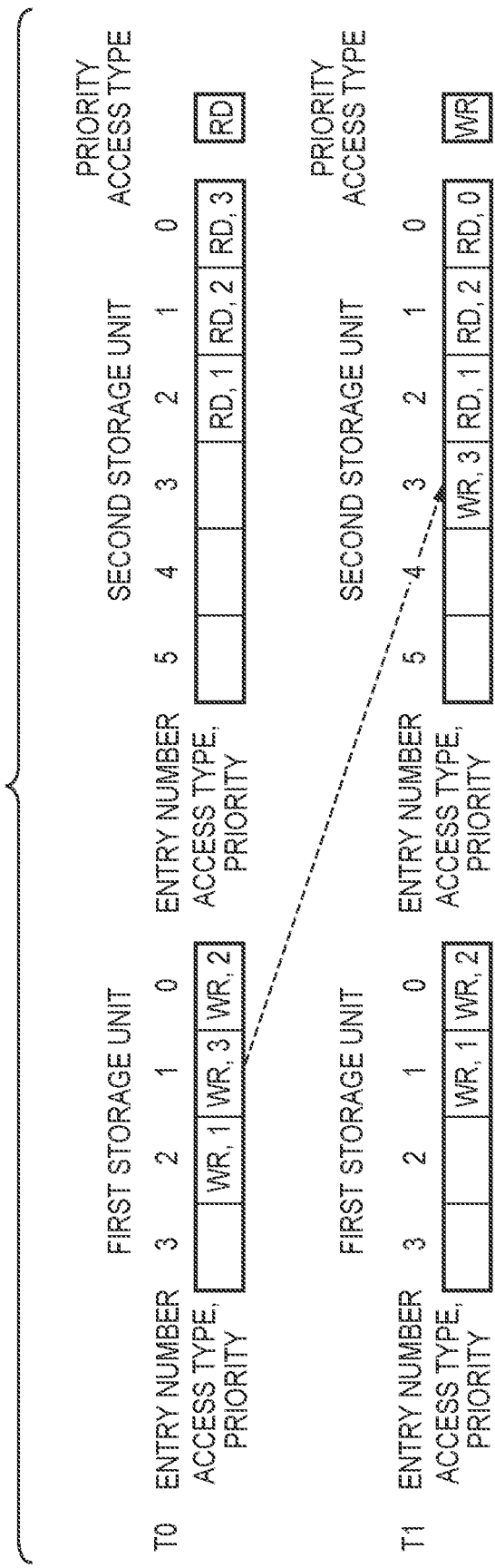
FIG. 3 is a diagram illustrating state transitions of a first storage unit and a second storage unit according to the first embodiment.

FIG. 3 shows respective states of the first storage unit 13 and the second storage unit 14 at a certain time T0 and a next time T1, and a priority access type generated by the second control unit 12. At T0, the first storage unit 13 stores requests in three of the four entries. In addition, the second storage unit 14 stores requests in three of the six entries.

In step S1 of extracting a request satisfying the condition (1) shown in FIG. 2, "(1) a request that is an intra-first storage unit request 104 stored in the first storage unit 13 and of which the priority is equal to or higher than a threshold" is extracted. In the example of FIG. 3, the first control unit 11 extracts requests with entry numbers 0 and 1 from the requests 104 in the first storage unit (for example, threshold=2).

Next, in step S3, the first control unit 11 determines that a request is present satisfying the condition (1), and the process proceeds to step S5. In step S5, the first control unit 11 selects, from the two requests, the request with the entry number 1 (priority=3), which is the request with the highest priority. Thereafter, in step S7, in a case where an empty entry is present in the second storage unit 14, the first control unit 11 transmits the selected request to the second control unit 12.

When the second control unit 12 receives the request transmitted by the first control unit 11, the second control unit 12 stores the request in the second storage unit 14. Each state of the first storage unit 13 and the second storage unit 14 after the series of operations is completed is shown in T1 of FIG. 3. The second storage unit 14 generates the DRAM command 102 from the request with the entry number 3 (priority=3) in order to generate the DRAM command 102 from the request with a high priority. Since the request of the entry number 3 is WR, the priority access type is changed to WR. Thereby, a request having a high priority can be stored in the second storage unit 14. Therefore, the real-time processing request can be processed quickly.

Next, an operation that is performed in a case where the condition (2) has been fulfilled will be described with reference to FIG. 4. The threshold of the priority in the condition (1) will be described as being 2.

Figure 4:
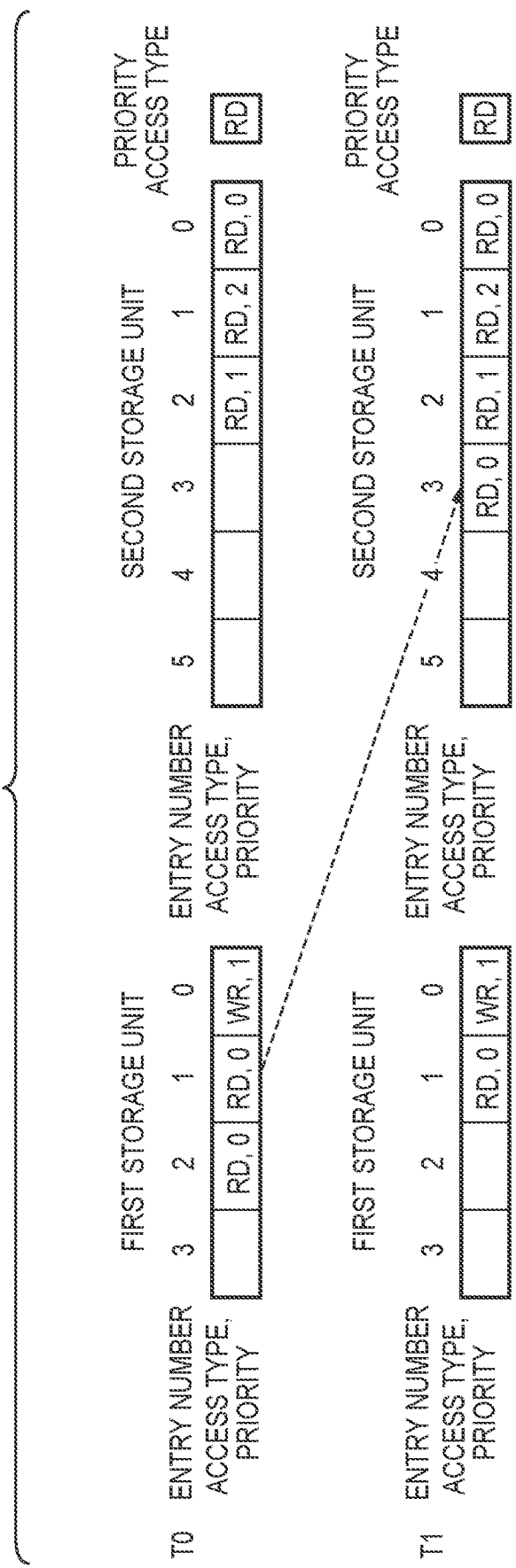
FIG. 4 is a diagram illustrating state transitions of the first storage unit and the second storage unit according to the first embodiment.

FIG. 4 shows respective states of the first storage unit 13 and the second storage unit 14 at a certain time T0 and a next time T1, and a priority access type generated by the second control unit 12. At T0, the first storage unit 13 stores requests in three of the four entries. In addition, the second storage unit 14 stores requests in three of the six entries. Since the request stored in the second storage unit 14 is only RD, the priority access type is RD.

In step S1 of extracting a request satisfying the condition (1) in FIG. 2, since all the priorities are less than the threshold (=2), the first control unit 11 does not extract any request from the requests 104 in the first storage unit. In step S2 of extracting a request satisfying the condition (2), the first control unit 11 extracts "(2) a request that is an intra-first storage unit request 104 stored in the first storage unit 13 and of which the access type matches the priority access type 112".

In the example of FIG. 4, the first control unit 11 extracts the requests with an entry number 1 and an entry number 2 corresponding to the access type matching the priority access type (RD) from the requests 104 in the first storage unit.

Next, in step S3, the first control unit 11 determines that no request is present satisfying the condition (1), and the process proceeds to step S4. In step S4, the first control unit 11 determines that a request is present satisfying the condition (2), and proceeds to step S6. In step S6, the first control unit 11 selects the request with the entry number 1, which is the oldest request, from the two requests described above. Thereafter, in step S7, in a case where an empty entry is present in the second storage unit 14, the first control unit 11 transmits the selected request to the second control unit 12.

When the second control unit 12 receives the request transmitted by the first control unit 11, the second control unit 12 stores the request in the second storage unit 14. The states of the first storage unit 13 and the second storage unit 14 after the series of operations is completed are shown in T1 of FIG. 4.

The second storage unit 14 generates the DRAM command 102 from the request with the entry number 1 in order to generate the DRAM command 102 from the request with the high priority. Since the request with the entry number 1 is RD, the priority access type remains RD. Since all requests in the second storage unit 14 are RD, switching between reading and writing does not occur. Therefore, the DRAM access penalty can be reduced.

The second control unit 12 may set the access type of the DRAM command last issued to the DRAM, as the priority access type. In addition, the second control unit 12 may change the priority access type in a case where a request of which the access type matches the priority access type is no longer present in the second storage unit 14.

As described above, in the present embodiment, a queue is divided into a first queue (first storage unit) and a second queue (second storage unit), and a DRAM command is generated for a request of the second queue. By limiting the generation of the DRAM command to the second queue, it is possible to suppress an increase in area of a reordering circuit while maintaining the reordering effect. In addition, it is possible to suppress occurrence of switching between reading and writing while quickly processing a request with a high priority.

As described above, according to the present embodiment, it is possible to make switching between reading and writing less likely to occur while quickly processing a request with a high priority, and thus it is possible to improve the access efficiency of the memory.

Second Embodiment

Figure 5:
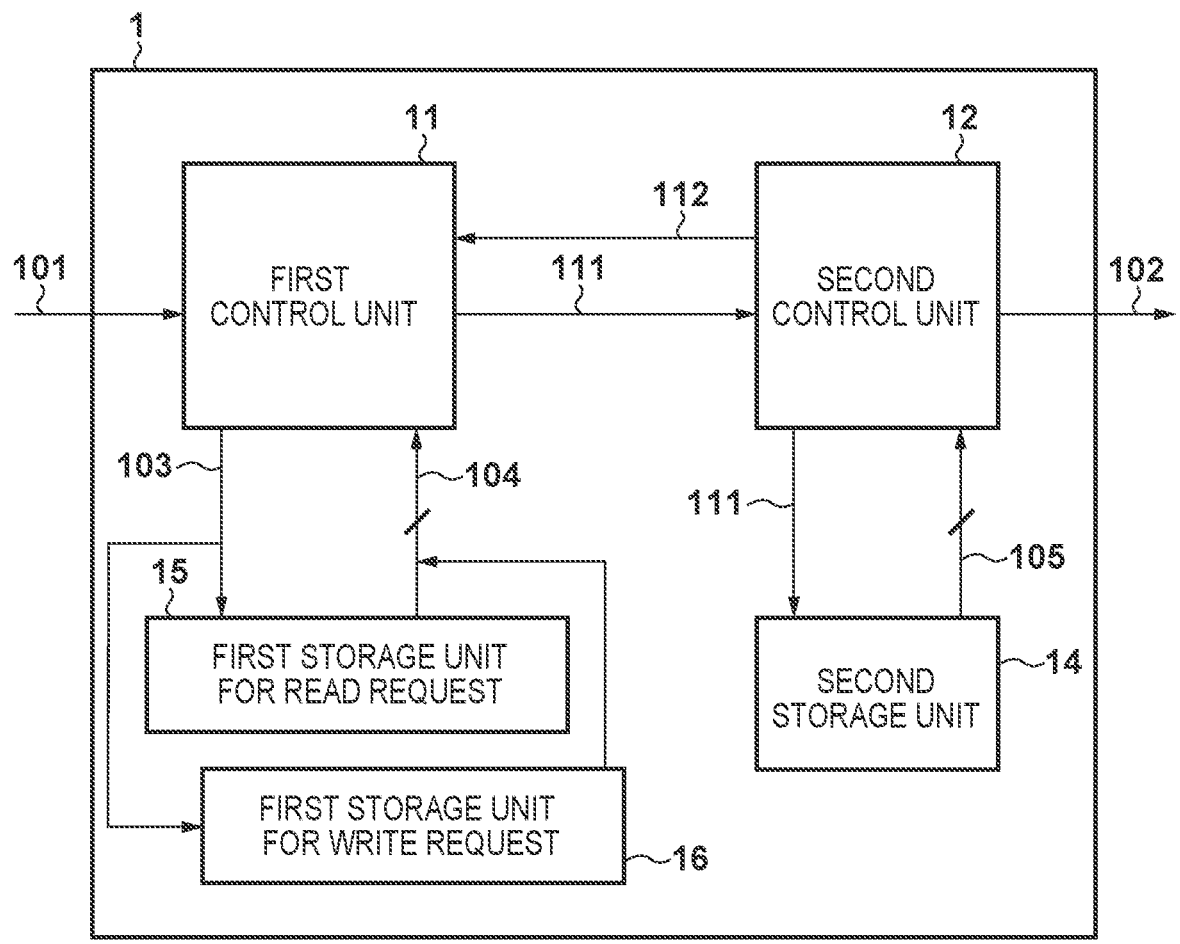
FIG. 5 illustrates a configuration diagram of a memory controller according to a second embodiment.

A second embodiment will be described with reference to FIG. 5. FIG. 5 is a diagram illustrating a configuration example of a memory controller according to a second embodiment. As shown in FIG. 5, the memory controller 1 includes a first control unit 11, a second control unit 12, a first storage unit for read request (read storage unit) 15, a first storage unit for write request (write storage unit) 16, and a second storage unit 14. Among these components, the second control unit 12 and the second storage unit 14 are the same as the second control unit 12 and the second storage unit 14 described in the first embodiment. The first storage unit 15 for read request and the first storage unit 16 for write request are obtained by dividing the first storage unit 13 of FIG. 1. The first storage unit 15 for read request is a storage unit for storing a read request. The first storage unit 16 for write request is a storage unit for storing a write request.

When a request 101 is received, the first control unit 11 stores a read request 103 in the first storage unit 15 for read request. On the other hand, the first control unit 11 stores a write request 103 in the first storage unit 16 for write request.

The first control unit 11 selects a request satisfying a condition from the intra-first storage unit requests 104 stored in the first storage unit 15 for read request and the first storage unit 16 for write request, and it transmits the selected request 111 to the second control unit 12. This operation is the same as or similar to that of the first control unit 11 described in the first embodiment.

The first control unit 11 can read all entries of both the first storage unit 15 for read request and the first storage unit 16 for write request in parallel. The intra-first storage unit request 104 integrates requests read from both the first storage unit 15 for read request and the first storage unit 16 for write request.

As described above, in the present embodiment, two first storage units, i.e., the first storage unit 15 for read request and the first storage unit 16 for write request, are provided. The first control unit 11 selects a request in an out-of-order manner from the first storage unit 15 for read request and the first storage unit 16 for write request. "Out-of-order" means that instructions are executed from an instruction having data necessary for processing regardless of the order of instructions described in a program. The second control unit 12 stores the request received from the first control unit 11 in the second storage unit 14.

As described above, according to the present embodiment, processing efficiency can be improved by holding the read request and the write request for each type.

Third Embodiment

Subsequently, a memory controller 1 according to a third embodiment will be described. Similar to the memory controller 1 according to the first embodiment, the memory controller 1 according to the third embodiment includes the first control unit 11, the second control unit 12, the first storage unit 13, and the second storage unit 14. Hereinafter, functions according to the third embodiment will be mainly described, and description of the same or similar functions as or to those of the first embodiment will be omitted. It is assumed that the number of entries of the second storage unit 14 is 6, and entry numbers 4 and 5 are entries dedicated to requests with high priorities.

Processing

Subsequently, an operation from selection of a request satisfying the condition (1) by the first control unit 11 to storage of the selected request 111 in the second storage unit 14 by the second control unit 12 will be described with reference to FIG. 6. The threshold of the priority in the condition (1) will be described as being 2.

Figure 6:
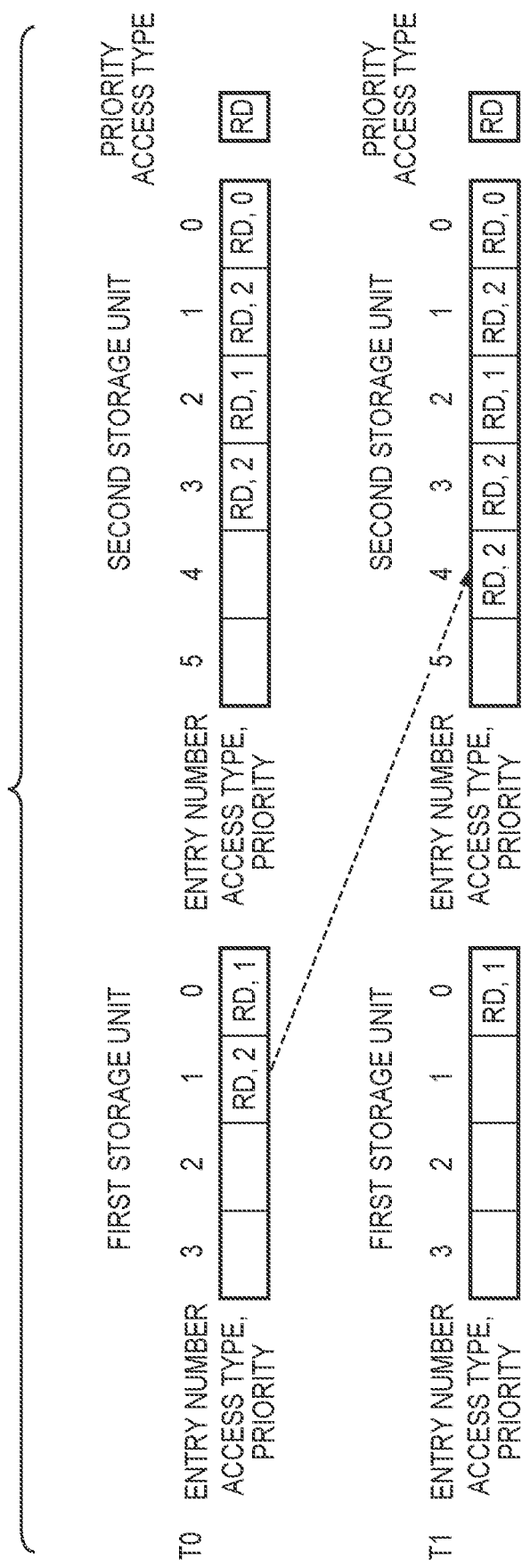
FIG. 6 is a diagram illustrating state transitions of a first storage unit and a second storage unit according to a third embodiment.

FIG. 6 shows respective states of the first storage unit 13 and the second storage unit 14 at a certain time T0 and a next time T1, and a priority access type generated by the second control unit 12. At T0, the first storage unit 13 stores requests in two of the four entries. In addition, the second storage unit 14 stores requests in four of six entries. Since the request stored in the second storage unit 14 is only RD, the priority access type is RD.

In step S1 of extracting a request satisfying the condition (1) in FIG. 2, the first control unit 11 extracts a request with an entry number 1 of which the priority is equal to or higher than the threshold (=2) from the requests 104 in the first storage unit.

Next, in step S3, the first control unit 11 determines that a request is present satisfying the condition (1), and the process proceeds to step S5. In step S5, the first control unit 11 selects the request with the entry number 1. Thereafter, in step S7, in a case where an empty entry is present in the second storage unit 14, the first control unit 11 transmits the selected request to the second control unit 12.

Figure 7:
FIG. 7 is a diagram illustrating state transitions of the first storage unit and the second storage unit according to the third embodiment.

Subsequently, an operation that is performed in a case where a request satisfying the condition (2) is not stored in the second storage unit 14 even if the request is selected by the first control unit 11 will be described with reference to FIG. 7. The threshold of the priority in the condition (1) will be described as being 2.

In step S2 of extracting a request satisfying the condition (2) in FIG. 2, the first control unit 11 extracts requests with entry numbers 0 and 1 corresponding to an access type matching the priority access type (RD) from the requests 104 in the first storage unit.

Next, in step S3, the first control unit 11 determines that a request is present satisfying the condition (2), and the process proceeds to step S6. In step S6, the first control unit 11 selects the request with the oldest entry number 0. Thereafter, in step S7, an empty entry is present in the second storage unit 14, but the entry number 4 and the entry number 5 are entries dedicated to requests with high priorities. Since openings are only present in entries dedicated to requests with high priorities, the first control unit 11 does not transmit the selected request to the second control unit 12. That is, in a case where openings are only present in entries dedicated to requests with high priorities, a request with a priority lower than the threshold is not stored in the second storage unit 14.

As described above, in the present embodiment, an entry dedicated to high priority is provided in the second storage unit 14. Thereby, since an entry can be secured for a request with a high priority, it is possible to suppress occurrence of a waiting period in which a request with a high priority cannot be processed.

According to the present invention, access efficiency to the memory can be improved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-076316, filed May 2, 2023, which is hereby incorporated by reference herein in its entirety.

What is claimed is:

1. A memory controller for controlling dynamic random access memory (DRAM), comprising:
   a first storage unit configured to store requests that each comprise information about a priority and an access type received by the memory controller;
   a first control unit configured to select requests from the requests stored in the first storage unit;
   a second storage unit configured to store the requests selected by the first control unit; and
   a second control unit configured to rearrange the requests stored in the second storage unit to generate a DRAM command and to issue the DRAM command to the DRAM, wherein
   the second control unit is configured to generate a priority access type indicating which access type request to preferentially issue to the DRAM, and
   the first control unit is configured to select the requests, based on the information about the priority and the access type of each of the requests stored in the first storage unit, and the priority access type.

2. The memory controller according to claim 1, wherein the first control unit is configured to select, from the requests stored in the first storage unit, a request of which the priority is equal to or higher than a threshold or a request of which the access type matches the priority access type.

3. The memory controller according to claim 2, wherein the first control unit selects a request with a highest priority in a case where there are a plurality of the requests present in the first storage unit of which the priority is equal to or higher than the threshold.

4. The memory controller according to claim 2, wherein the first control unit selects a request of which the access type matches the priority access type in a case where no request is present in the first storage unit of which the priority is equal to or higher than the threshold.

5. The memory controller according to claim 4, wherein the first control unit selects an oldest request in a case where there are a plurality of the requests present in the first storage unit of which the access type matches the priority access type.

6. The memory controller according to claim 1, wherein the access type indicates read or write.

7. The memory controller according to claim 1, wherein the second control unit is configured to set, as the priority access type, an access type of the DRAM command last issued to the DRAM.

8. The memory controller according to claim 1, wherein the second control unit changes the priority access type in a case where a request of which the access type matches the priority access type is no longer present in the second storage unit.

9. The memory controller according to claim 1, wherein the first storage unit comprises:
a read storage unit configured to store a request of which the access type is read; and
a write storage unit configured to store a request of which the access type is write.

10. The memory controller according to claim 9, wherein the first control unit is configured to select a request in an out-of-order manner from the request stored in the read storage unit and the request stored in the write storage unit.

11. The memory controller according to claim 10, wherein
the second storage unit comprises a first entry that can accept a request regardless of the priority and a second entry that can accept a request of which the priority is equal to or higher than a threshold, and
the first control unit does not store a request of which priority is less than the threshold in the second storage unit in a case where no opening is present in the first entry.

12. A control method of a memory controller for controlling dynamic random access memory (DRAM), the control method comprising:
generating a priority access type indicating which access type request to preferentially issue to the DRAM;
first controlling of:
storing requests that each comprise information about a priority and an access type received by the memory controller in a first storage unit; and
selecting requests from the requests stored in the first storage unit, based on the information about the priority and the access type, and the priority access type; and
second controlling of:
storing the requests selected in the first controlling in a second storage unit;
rearranging the requests stored in the second storage unit to generate a DRAM command; and
issuing the DRAM command to the DRAM.

13. A non-transitory computer-readable storage medium having a program stored thereon for causing a computer to execute a control method of a memory controller for controlling dynamic random access memory (DRAM), the control method comprising:
generating a priority access type indicating which access type request to preferentially issue to the DRAM;
first controlling of:
storing requests that each comprise information about a priority and an access type received by the memory controller in a first storage unit; and
selecting requests from the requests stored in the first storage unit, based on the information about the priority and the access type, and the priority access type; and
second controlling of:
storing the requests selected in the first controlling in a second storage unit;
rearranging the requests stored in the second storage unit to generate a DRAM command; and
issuing the DRAM command to the DRAM.

\* \* \* \* \*